United States Patent [19]

Falender et al.

[11] 4,448,927

[45] May 15, 1984

[54] METHOD OF POLYMERIZING OLIGOMERS OF POLYDIORGANOSILOXANE IN THE PRESENCE OF FILLER

[75] Inventors: James R. Falender, Sanford; John C. Saam, Midland, both of Mich.

[73] Assignee: Dow Corning Corporation, Midland, Mich.

[21] Appl. No.: 474,916

[22] Filed: Mar. 14, 1983

[51] Int. Cl.³ .............................................. C08L 83/04
[52] U.S. Cl. ................................... 524/860; 525/478; 524/862; 524/863; 524/865; 524/588; 524/493; 528/15; 528/31; 528/32; 528/23
[58] Field of Search ............... 524/860, 863, 862, 865, 524/588, 493; 528/15, 31, 32, 23; 525/478

[56] References Cited

U.S. PATENT DOCUMENTS 3,447,988 11/1969 Ostrozynski ..................... 156/229

FOREIGN PATENT DOCUMENTS 1325654 8/1973 United Kingdom .

Primary Examiner—Melvyn I. Marquis
Attorney, Agent, or Firm—E. C. Elliott

[57] ABSTRACT

Oligomers of low molecular weight polydiorganosiloxanes, polydiorganocyclosiloxanes, or mixtures are polymerized in the presence of acidic or neutral reinforcing fillers. Trifluoromethane sulfonic acid is used as the polymerization catalyst. The method can also include endblocked polydiorganosiloxane to control the molecular weight of the silicone polymer in the silicone polymer-filler produced. The method combines the oligomer and filler, heats to from about 70° to 150° C., adds catalyst, adjusts temperature, and polymerizes the mixture, then inactivates with a Lewis base such as calcined magnesium oxide. The non-crepeing silicone polymer-filler mixture which is the product of the method is usable as electrical insulation grease, or as a reinforced polymer mixture useful in producing silicone elastomers. The mixture can be mixed with curing agents to produce heat curable and moisture curable elastomeric compositions.

24 Claims, No Drawings

METHOD OF POLYMERIZING OLIGOMERS OF POLYDIORGANOSILOXANE IN THE PRESENCE OF FILLER

BACKGROUND OF THE INVENTION

1. Field of the Invention

This invention relates to the polymerization of oligomers of polydiorganosiloxane in the presence of reinforcing filler using trifluoromethane sulfonic acid as catalyst.

2. Description of the Prior Art

Silicone polymer-filler mixtures have been used as electrical insulation greases and as precursors in the production of silicone elastomers. A customary method of producing these mixtures has been mechanically mixing the selected filler into a polymer of the desired viscosity.

Ostrozynski, in U.S. Pat. No. 3,477,988, issued Nov. 11, 1969, teaches that low molecular weight diorganocyclosiloxane and silica filler can be mixed together, then polymerized by a base-catalyzed rearrangement in the presence of a promoter to yield a highly viscous, opaque substance resembling grease. His Example 18 teaches that mixed cyclic dimethylsiloxanes, fumed silica filler, and potassium silanolate catalyst do not polymerize without hexamethylphosphoramide promoter. Ostrozynski states at col. 10, lines 43–48, that efforts to produce filled silicone polymers by rearranging low molecular diorganocyclosiloxane polymers in the presence of high surface area silica fillers has been successful when acidic catalysts were employed. He teaches nothing further concerning the polymerization with acidic catalysts.

Buchner et al., in British Pat. No. 1,325,654, published Aug. 8, 1973, disclose a process for manufacture of a mixture of a high molecular weight linear organopolysiloxane with an acidic or neutral filler. They mix together a low molecular weight diorganocyclosiloxane, filler, and at least 0.05% of the weight of the siloxane of anhydrous perfluoroalkane sulfonic acid. The low molecular weight diorganocyclosiloxane can be mixed with low molecular weight linear polydiorganosiloxane. The temperature of polymerization is below 50° C. They teach that higher temperatures are disadvantageous in that polymerization only reaches a moderate degree, for example, up to an oil of about 1000 centipoise, if the initiator is neutralized at the temperature employed. They further teach that if the neutralization before cooling is omitted, an unusable gel is obtained.

SUMMARY OF THE INVENTION

A method has been developed to polymerize oligomer in the presence of reinforcing filler to give a non-crepeing silicone polymer-filler mixture. The method comprises mixing hydroxyl endblocked polydiorganosiloxane, polydiorganocyclosiloxane, or mixtures of the two, with reinforcing filler such as fumed silica, heating to a temperature of from 70° to 150° C., catalyzing with trifluoromethane sulfonic acid, adjusting the temperature to from 20° to 100° C. and polymerizing, then inactivating the catalyst.

The method of this invention yields a non-crepeing silicone polymer-filler mixture useful as electrical insulation grease, or as a reinforced polymer mixture useful in producing silicone elastomers.

The method of this invention yields a non-crepeing silicone polymer-filler mixture which is stable on storage without use of pretreated filler or use of anti-crepe hardening agents such as are normally necessary in order to produce non-crepeing mixtures of silicone polymers and reinforcing fillers such as fumed silica.

The method of this invention yields a non-crepeing silicone polymer-filler mixture using less energy than previous methods.

DESCRIPTION OF THE INVENTION

This invention relates to a method of polymerizing oligomer in the presence of reinforcing filler comprising (A) mixing (i) 100 parts by weight of oligomer selected from the group consisting of polydiorganosiloxane (a) of the formula $$HO(R_2SiO)_xH,$$

polydiorganocyclosiloxane (b) of the formula $$(R_2SiO)_y,$$

and mixtures thereof, optionally (i) can have present oligomer selected from the group consisting of polydiorganosiloxane (c) of the formula $$R'_3SiO(R_2SiO)_zSiR'_3,$$

polydiorganosiloxane (d) of the formula $$R'_3SiO(R_2SiO)_zH,$$

and mixtures thereof wherein each R is a radical selected from the group consisting of methyl, ethyl, propyl, phenyl, vinyl, allyl, and 3,3,3-trifluoropropyl; each R' is a monovalent hydrocarbon radical of 6 or less carbon atoms, x is an average value in the range of from 3 to 50, y is an average value in the range of from 3 to 10, and z is an average value in the range of from 0 to 50 inclusive; with (ii) from 2 to 70 parts by weight of reinforcing filler which is acidic or neutral, to yield a paste-type material, (B), initiating polymerization of (A) in a closed system at a temperature in the range of 70° to 150° C. with from 400 to 4000 parts by weight trifluoromethane sulfonic acid per million parts by weight of (i), then (C) agitating the resulting product of (B) adjusting its temperature to a value in the range of 20° C. to 100° C., polymerizing until the desired increase in molecular weight is reached, then (D) admixing a Lewis base to inactivate the trifluoromethane sulfonic acid and produce a non-crepeing silicone polymer-filler mixture.

The method of this invention produces a dispersion of a high surface area, reinforcing filler within linear silicone polymer. The method of this invention produces, directly and economically, a product suitable for use in producing electrical insulation grease, sealants, and silicone elastomers. These various types of products are produced from silicone polymer-filler mixtures which are made by varying the type and amount of the reinforcing silica used, the molecular weight of the polymer formed, and the organic radicals present in the polymer.

The method of this invention uses as starting oligomers, hydroxyl endblocked linear polydiorganosiloxane (a), polydiorganocyclosiloxane (b), and mixtures thereof and optionally for purposes of providing triorganosiloxy endblocked polymers (c), (d), or mixtures thereof can be used with the starting oligomers. Reinforcing filler is mixed with the low viscosity oligomer before polymerization takes place. The amount of energy necessary to disperse the reinforcing filler in the oligomer is significantly lower than that necessary to disperse a reinforcing filler in a high molecular weight polymer, particularly polymers of the gum type used in making conventional heat cured silicone elastomers.

Previously, the interaction between filler and polymer known as crepe hardening could be prevented by using reinforcing fillers which had been pretreated, or those treated in situ. The product produced by the method of this invention does not require either pretreated filler or anti-crepe hardening agents in order to produce a non-crepeing mixture. The method of this invention is more economical because the pretreated filler or a treating agent are no longer necessary. The silicone polymer-filler mixture produced by the method of this invention is non-crepeing, that is, the mixture does not crepe harden upon storage for a period of time of at least 6 months. A silicone polymer-filler mixture produced by the method of this invention remains as a useable mixture for a commerically useful period of time without crepe-hardening to the point where it must be further processed, as on a 2 roll mill, to make it useful. In those embodiments in which the silicone polymer-filler mixture is used as an insulation grease or in the production of sealants for instance, the inactivated mixture remains as an extrudable paste. In those embodiments in which the gum-consistency silicone polymer-filler mixture is used in the production of silicone elastomer for instance, the mixture is of such a consistency that it is processed in a dough mixer or on a 2 roll mill. Such mixture produced by the method of this invention can be compounded into products for a period of at least 6 month, commonly for a period of years.

When the method of this invention is followed using hydroxyl endblocked polydiorganosiloxane (a) as a starting ingredient, a silicone polymer-filler mixture is produced which has a low volatile content, when compared to using polydiorganocyclosiloxane (b) as a starting ingredient.

The polydiorganosiloxane (a) of the formula $HO(R_2SiO)_xH$ wherein each R is a radical selected from the group consisting of methyl, ethyl, propyl, phenyl, vinyl, allyl, and 3,3,3-trifluoropropyl; and x is an average value in the range of from 3 to 50 is a known material. It is commonly manufactured by the addition of the appropriate diorganodichlorosilane to a water/solvent mixture to yield a mixture of low molecular weight hydroxyl endblocked oligomers and cyclic siloxanes in solvent. Purification and distillation of the mixture yields both the polydiorganosiloxane (a) of the above formula and also the polydiorganocyclosiloxane (b) of the formula $(R_2SiO)_y$ wherein y is an average value in the range of from 3 to 10, and each R is as defined above. The polydiorganosiloxane (a) is preferred in which x is from 10 to 50. The mixture of the polydiorganosiloxane (a) and the polydiorganocyclosiloxane (b) can be used in the method of this invention without their separation from each other in the above-described hydrolysis procedure. When the mixture is used, it is preferred that x is from 10 to 50 and y is from 3 to 6. The material to be polymerized can also contain a polydiorganosiloxane (c) of the formula $R'_3SiO(R_2SiO)_zSiR'_3$ or polydiorganosiloxane (d) of the formula $R'_3SiO(R_2SiO)_zH$ wherein each R is as defined above and each R' is a monovalent hydrocarbon radical of 6 or less carbon atoms such as methyl, ethyl, propyl, butyl, vinyl or phenyl and z is an average value in the range of from 0 to 50 inclusive. These polydiorganosiloxanes (c) and (d) are used to introduce $R'_3SiO_{0.5}$ endblocking units into the polymer being formed. When the silicone polymer-filler mixture produced by the method of this invention is to be used in a relatively low viscosity application, such as in sealant materials or electrical insulation greases, it is desirable to include $R'_3SiO_{0.5}$ units as endblocking units to aid in obtaining a polymer of the desired molecular weight.

The amount of ingredients (c) and (d) to be added is determined by the average molecular weight desired in the final silicone polymer-filler mixture. A larger concentration of (c) and (d) in the starting materials will yield lower molecular weight in the final product. The optimum amount of (c) and (d) to use to obtain the desired result is best determined by experiment.

The polydiorganosiloxane (c) of the above formula and the polydiorganosiloxane (d) of the above formula are known materials. The siloxanes (c) and (d) can be easily produced by reacting a low molecular weight hydroxyl endblocked polydiorganosiloxane with a reactive silane of the formula $(R'_3Si)_nX$ where n is the valence of the reactive group, X. X can be any of the well known groups which react with hydroxyl groups on silicon such as —Cl, —NH$_2$, —NR$_2^2$, —N(R$^2$)COR$^2$, —NHR$^2$, =NH, and =NR$^2$. R$^2$ is selected from the group consisting of monovalent hydrocarbon radicals of 5 or less carbon atoms, phenyl radical, and benzyl radical. When the reactive silane is added to the hydroxyl endblocked polydiorganosiloxane the materials react spontaneously, resulting in the replacement of the hydroxyl group with an $R'_3SiO)_{0.5}$ group. The byproduct hydrogen chloride, ammonia, or amide is easily removed from the reaction mixture. One preferred method uses the addition of stoichiometric amounts of two reactive silanes such as $(R'_3Si)Cl$ and $(R'_3Si)NH_2$ to a hydroxyl endblocked polydiorganosiloxane. The leaving groups then react with each other and the salt is easily filtered from the reaction mixture.

A preferred form of the polydiorganosiloxane (c) is of the formula $R'_3SiOSiR'_3$. This polydiorganosiloxane can be easily co-reacted with the polydiorganosiloxane (a) or the polydiorganocyclosiloxane (b) or mixtures of the two during the polymerization steps (B) and (C) to provide the amount of endblocking needed to produce the desired molecular weight. The amount of (c) added is determined by the molecular weight of the desired siloxane polymer in the final silicone polymer-filler mixture; the more of (c) that is added, the lower the molecular weight will be. In this embodiment wherein the disiloxane can be co-reacted during the polymerization, the amount of disiloxane to be added is best determined by experimentation using the desired (a) and/or (b) and the reinforcing filler (ii), because the amount of (c) necessary will be influenced by the presence of the reinforcing filler. The amount of (c) will normally be small, less than 5 parts by weight per 100 parts by weight of (a) plus (b); preferably less than 1 part by weight where a silicone polymer of an average molecular weight greater than 50,000, for instance, is desired.

The polydiorganosiloxane (d) can be produced using the reaction between diorganocyclotrisiloxane and organo lithium compounds described in U.S. Pat. No. 3,337,497, issued Aug. 22, 1967, to Bostick, which is hereby incorporated by reference to show the preparation of polydiorganosilane (d) having a hydroxyl radical at one end and a $R'_3SiO_{0.5}$ radical at the other end. Other methods of producing (d) are disclosed in U.S. Pat. No. 3,274,145, issued Sept. 20, 1966, to Dupree, which is hereby incorporated by reference to show preparation of polydiorganosiloxane (d). In this embodiment, as above for the use of (c), the amount of (d) to be added is best determined by experimentation using the desired (a) and/or (b) and the reinforcing filler (ii) because the amount necessary will be influenced by the presence of the reinforcing filler. An increase in (d) will lower the molecular weight of the final polymer. The amount will normally be small, less than 5 parts by weight based upon 100 parts by weight of (a) plus (b).

A silicone polymer-filler mixture having a silicone polymer containing reactive organic radicals can be produced through the use of (c) or (d) in which at least one of the R' radicals is a reactive radical such as vinyl or allyl. Such a reactive $R'_3SiO_{0.5}$ group as an endblocking group is desirable in some of the methods used to produce a curable composition from the silicone polymer-filler mixture.

When (c) or (d) are present in the polymerization, the product can be a mixture of polymers, some having one end $R'_3SiO_{0.5}$ and the other end hydroxy radical, some having both ends $R'_3SiO_{0.5}$, and some having both ends hydroxyl radicals. The amounts of each type of polymer present depends upon how much (c) or (d) is added, how much reactive filler surface is present, and how vigorous the polymerization conditions used are.

The fillers used in the method of this invention are those which are finely divided particles of an acidic or neutral nature and are classed as reinforcement for silicone elastomers. Examples of such fillers include carbon black, amorphous silica such as fumed silica, precipitated silica, and diatomaceous earth, and fumed titanium dioxide. The reinforcing fillers have particle sizes in the colloidal range and specific surface area of greater than about 50 $m^2/g$, usually above 150 $m^2/g$. The most useful reinforcing filler is fumed silica with a specific surface area of from 150 $m^2/g$ to 450 $m^2/g$. These reinforcing fillers exhibit varying degrees of acidity due to the hydroxyl radicals present on their surface. For the purposes of this invention, an acidic filler is one which gives a pH of less than 7 when a 2 percent by weight slurry is prepared with distilled water. A neutral filler would give a pH of about 7.

The amount of reinforcing filler used in the method of this invention varies from 2 to 70 parts by weight of reinforcing filler per 100 parts by weight of diorganosiloxane. The higher the surface area of the filler, the more effect it will have on the properties of the mixture.

If fumed silica is used as the filler, increasing the filler content may result in a lower average molecular weight of the final polymer and a lower conversion rate of the oligomer into the final polymer; other conditions being held constant. Longer polymerization times, for instance, would probably result in higher conversion rates. If a silicone elastomer is produced from the silicone polymer-filler mixture, the hardness and tensile strength of the elastomer may increase as the amount of filler or the surface area of the filler increases. A preferred amount of fumed silica is from 10 to 50 parts by weight if the silicone polymer-filler mixture is to be used to produce elastomers because these amounts provide the best range of physical properties. If the silicone polymer-filler mixture is to be used to produce a sealant, the preferred amount of fumed silica is from 5 to 20 parts by weight.

The initial step in the method of this invention is the dispersion of the filler into the oligomer. The more uniformly and completely the filler is dispersed, the more uniform will be the final product. The mixing process can be done in a container with a stirrer, by rolling the ingredients together in a jar, or by passing the mixed ingredients through an intensive mixer such as a colloid mill. Because the filler is dispersed into the low viscosity oligomer, it requires much less energy and time to obtain a good dispersion than the conventional method of dispersing the filler in a high viscosity polymer such as a gum. The oligomer-filler mixture should be a slurry or paste.

The degree of interaction between the polymer and filler appears to be lessened by allowing some water to be present at the beginning of the process. The amount of water normally present in fillers of this type is sufficient; no additional water needs to be added. The reinforcing fillers used in this invention usually have a reactive surface which normally contains hydroxyl radicals chemically bound to the surface as well as free water that is physioadsorbed on the filler surface. There may also be a small amount of water dissolved in the oligomer.

The mixture in step (A) of filler dispersed in oligomer is then placed into a reaction container. The reaction container is defined in this invention as being a closed system. By this is meant that the reaction container has a cover so that the atmosphere inside the container can be controlled. The reaction container also has sealable opening. The reaction container should be capable of stirring the mixture during polymerization, heating the mixture, controlling the atmosphere in the container to allow removing moisture from the mixture by application of a dry gas purge, vacuum, or both, and cooling the mixture. A stirrer equipped resin kettle with heater, dry gas purge, and vacuum attachment is suitable, as is a similarly equipped dough mixer. The mixture is heated to a temperature of from 70° C. to 150° C. to induce rapid initiation of the polymerization reaction. Because there is usually water present in the mixture to some degree and because water can be a by-product of the polymerization, it is generally necessary to remove water from the mixture during polymerization. When polymers of gum viscosity are desired, water present in the mixture must be removed to a greater degree than when low molecular weight polymer is the end product. The water can be removed by sweeping the space in the container above the mixture with dry inert gas, by reducing the pressure in the container by drawing a vacuum on the container and thus drawing the water out, or by a combination of these means.

Trifluoromethane sulfonic acid is added to the mixture resulting from step (A) in an amount of from 400 to 4000 parts by weight of acid per one million parts by weight of oligomer (i).

As the amount of trifluoromethane sulfonic acid is increased, the polymerization rate increases. Because the trifluoromethane sulfonic acid reacts with the hydroxy group on the end of the linear oligomer (a) or with the ends of the opened up cyclical oligomer (b), the trifluoromethane sulfonic acid can act as an endblocking group if enough acid is present to react with all of the oligomer end groups. For this reason, the equilibrium molecular weight obtained will decrease as the amount of acid present is increased. A concentration of about 1000 parts per million has been found preferable for producing high molecular weight polymers.

After step (B), the mixture is adjusted in temperature while continuing the mixing operation. During this step (C), the polymerization continues and the molecular weight of the polymer rises. Any water present at this time may act as an endblocking agent. When a high molecular weight polymer such as a gum is desired, the water must be removed during this step to allow the polymerization to proceed and the temperature is reduced to a temperature in a range of from 20° C. to 30° C. Under these conditions, a high polymer molecular weight can be produced.

When the desired molecular weight of the polymer is achieved, the mixture is inactivated with a Lewis base. The point at which the desired molecular weight is reached can be determined by following the rise in viscosity of the polymer-filler mixture. Sufficient Lewis base is added to neutralize the trifluoromethane sulfonic acid catalyst. A stoichiometric amount of Lewis base, based upon the amount of trifluoromethane sulfonic acid present in the system, would be the minimum amount added. If silazane is used, for instance, a large excess over the stoichiometric amount required could not only react with the catalyst but the excess could react with hydroxyl groups on the silicone polymer. This could interfere with further crosslinking and curing reactions if such reactions are to be used in utilizing the silicone polymer-filler mixture. If the silicone polymer-filler mixture is to be used as an insulating electrical grease, for instance, where there is no requirement for reactive end groups, such considerations of the amount of Lewis base agent to be used would not be necessary. Additional considerations in selecting a preferred Lewis base include whether it is more convenient to add a gas, a liquid, or a solid in view of the equipment being used. Another consideration is whether any salt formed is to be removed or not. Salts which may effect the heat stability of the products should be removed. Byproduced salts from magnesium oxide show little effect on the heat stability. Preferred Lewis bases include ammonia, amines such as diethylamine, basic metal oxides such as calcium oxide and magnesium oxide, silazanes such as hexamethyldisilazane, and alkoxides such as potassium tertiary butoxide and magnesium isopropoxide. Magnesium oxide was found to be a preferred inactivating agent when the polydiorganosiloxane is polymerized to a high viscosity such as a gum. Because water, added to the system while the catalyst is active, acts as a source of endblocking groups, it was found necessary to calcine the magnesium oxide before it was used. When uncalcined magnesium oxide was added to a polymer-filler mixture in the inactivation step, the viscosity of the mixture became lower. When calcined magnesium oxide was used, the viscosity remained the same. In those applications where the heat stability of the cured product is of importance, a minimum amount of calcined magnesium oxide is preferred.

An amount of less than 2 parts by weight of calcined magnesium oxide per 100 parts by weight of (i) is preferred because larger amounts effect the heat stability of the silicone polymer-filler mixture. The polymer-filler material after inactivation is a non-crepeing material which does not become "nervy" or crepe-age.

The non-crepeing silicone polymer-filler mixture obtained following the method of this invention contains polymers having a broad distribution of molecular weights. The exact distribution will depend upon the polymerization conditions used. A measure of the amount of low molecular weight material present is a weight loss measurement upon heating. The material lost upon heating the silicone-polymer filler mixture, for 3 hours at 150° C. for instance, represents the unreacted oligomer still present and the low molecular weight polymers formed. In a production situation, the silicone polymer-filler mixture would be heated in a closed system to remove the volatile materials and to collect and condense them so that they could be reused. The silicone polymer-filler mixture is a heat stable material, that is, it does not decompose on exposure to heat at temperatures such as 150° C. Once the original volatile material is removed, the weight loss is very low. For instance, the mixture of Example 3 gave a weight loss on heating 2 hours at 150° C. of only 0.04 percent by weight, once the mixture had been devolatilized. A preferred method of producing a non-crepeing silicone polymer-filler mixture, following the method of this invention, begins with a hydroxyl endblocked polydiorganosiloxane (a) because the polymerization takes place with minimum production of cyclic material and yields a final mixture with a minimum amount of low molecular weight material present. Such a silicone polymer-filler mixture can be used as is or further processed as into a curable elastomeric material without another step to remove the volatile materials. When molded, such products do not exhibit excessive shrinkage.

The silicone polymer-filler mixture obtained by following the method of this invention is useful in the same manner as is the conventional filled polydiorganosiloxane. Because the method of this invention mixes the reinforcing filler with the oligomer, the mixing step requires a minimum amount of energy. In those embodiments in which a gum viscosity polymer is produced, the energy saving can be significant when this method is compared to the usual method of mixing reinforcing filler into gum polymer. The silicone polymer-filler mixture is a non-crepeing mixture. The conventional method of mixing a high viscosity polydiorganosiloxane and reinforcing filler together requires that the filler be pretreated or treated in situ with anti-crepe agent to prevent crepe-aging over a period of time. The use of pretreated filler or anti-crepe agents is not required in the method of this invention, the mixture can be stored without use of such ingredients. The silicone polymer-filler mixture can be used in silicone products used as insulating compounds, in greases, or in producing elastomers in the well-known methods of producing such products.

When the polymerization of the oligomer is to be carried out so as to produce a high molecular weight product (such as one having a degree of polymerization of greater than 1000), it is desirable to remove free water before the addition of the trifluoromethane sulfonic acid.

In the preparation of such high molecular weight products, after the oligomer and filler (ii) are combined in step (A), water can be removed from the mixture by heating in a closed system to a temperature in the range of 100° C. to 200° C., preferably from 140° C. to 170° C. The temperature used should be chosen in view of the oligomer being used, lower temperatures for low molecular weights. Water present in the system can be removed by known means such as sweeping the space above the mixture with a dry inert gas, by reducing the pressure on the system by drawing a vacuum and removing the water, or by a combination of means. This drying step is continued until the free water present is removed. A cold trap in the exit gas line can be used to condense the water being removed to monitor the rate, thus allowing a determination of when the free water has been sufficiently removed.

After this removal of free water, the temperature of the mixture is adjusted to a temperature in the range of 100° C. to 150° C., preferably from 110° C. to 140° C., then the trifluoromethane sulfonic acid is added. The catalyst initiates polymerization of the oligomer, a process which may yield water as a byproduct. During the polymerization the temperature of the mixture is reduced until it reaches room temperature. The byproduct water must be removed until the desired molecular weight is produced. The mixture is then inactivated in the same manner as discussed above. The product is a non-crepeing polymer-filler mixture which is suitable for producing curable compositions which yield cured silicone elastomers.

High viscosity silicone polymer-filler mixtures produced by the method of this invention which contain hydroxyl radical on the end or $R'_3SiO_{0.5}$ radicals as endblocking units can be used in producing curable compositions which yield cured silicone elastomer in the same manner as is done with conventional mixtures of high viscosity polydiorganosiloxanes and filler. Organic peroxide vulcanizing agents can be added to the silicone polymer-filler mixtures. If the silicone polymer-filler mixture does not contain any vinyl radicals, it is vulcanized with organic peroxides that are efficient in causing reactions in non-vinyl containing polydiorganosiloxanes. Such organic peroxides are labeled "non-vinyl specific" and are represented by such organic peroxides as benzoylperoxide and 2,4-dichlorobenzoylperoxide. If the silicone polymer-filler mixture contains vinyl radicals, it can be vulcanized with either "non-vinyl specific" or "vinyl specific" organic peroxides. Representative of the vinyl specific organic peroxides are ditertiary-butyl peroxide and 2,5-bis-(tert-butylperoxy)-2,5-dimethylhexane. The properties of the cured silicone elastomer can be altered by the type and amount of vulcanizing agent used to cure the composition. Typical changes due to such choices are well recognized in the art. The organic peroxide vulcanizing agent can be present in amounts from 0.1 to 5 parts by weight per 100 parts by weight of the silicone polymer-filler mixture, preferably from 0.5 to 2.0 parts by weight.

The embodiments of the method of this invention which give a polymer having hydroxyl groups on the ends can be further mixed with curing agents to yield curable compositions. A number of methods are known for combining hydroxyl containing polydiorganosiloxane in an essentially anhydrous mixture with a curing agent to yield a one part curable composition. These compositions cure to silicone elastomers upon exposure to the atmosphere. Methods are available based upon tri-functional and tetra-functional silanes as crosslinking agents as well as short polymeric crosslinkers. Among the functional groups used are acetoxy radicals, alkoxy radicals, amino radicals, and amido radicals. Common crosslinkers include those represented by the formulas:

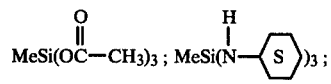

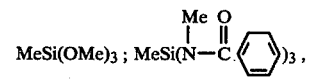

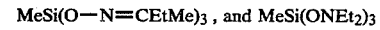

where Me is the methyl radical and Et is the ethyl radical. Common catalysts for these systems include metal carboxylates, alkyl metal carboxylates, alkyl metal alkoxides, and titanates. Commonly used are stannous octoate, dibutyltindiacetate, dibutyltindilaurate, tetrabutyltitanate, dibutyltindimethoxide, and tetraisopropyltitanate. Methods of producing one part compositions which cure to silicone elastomers upon exposure to moisture based upon hydroxyl-containing polydiorganosiloxanes in which the silicone polymer-filler mixture of this invention can be substituted for the hydroxyl containing polydiorganosiloxane include those disclosed in U.S. Pat. Nos. 3,077,465, issued Feb. 12, 1963 to Bruner; 3,189,576, issued June 15, 1965 to Sweet; 3,294,739, issued Dec. 27, 1966 to Weyenberg; and 3,334,067, issued Aug. 2, 1967 to Weyenberg; all of which are incorporated by reference to teach methods of mixing curing agents into hydroxyl containing polydiorganosiloxanes in which the silicone polymer-filler mixture of this invention can be substituted to yield compositions stable in the absence of moisture which cure to silicone elastomers upon exposure to moisture.

Methods are well known for combining hydroxyl-containing polydiorganosiloxanes with curing agents that produce two part products which cure at room temperature upon mixing the ingredients. Examples of such methods in which the silicone polymer-filler mixture of this invention can be substituted for the hydroxyl-containing polydiorganosiloxanes are found in U.S. Pat. Nos. 3,061,575, issued Oct. 3, 1962 to Russell; 3,184,427, issued May 18, 1965 to Russell et al.; 3,509,081, issued Apr. 28, 1970 to Gignac, Jr; and 3,989,668, issued Nov. 2, 1976 to Lee et al., all of which are incorporated by reference to teach methods of mixing curing agents into hydroxyl containing diorganosiloxanes in which the silicone polymer-filler mixture of this invention can be substituted to yield compositions which cure to silicone elastomers.

Silicone polymer-filler mixture containing two or more unsaturated monovalent aliphatic radicals per polymer molecule such as vinyl and allyl radicals can be combined with a curing agent comprising an organohydrogensiloxane having an average of greater than two silicon-bonded hydrogen atoms per molecule, and a platinum-containing catalyst in an amount sufficient to provide at least one part by weight platinum per million parts by weight of silicone polymer in the silicone polymer-filler mixture. The organohydrogensiloxane is present in sufficient quantity to provide at least one silicone-bonded hydrogen atom per unsaturated monovalent aliphatic radical in the silicone polymer. A preferred organohydrogensiloxane has an average of at least three silicon-bonded hydrogen atoms per molecule and has units selected from the group consisting of methylhydrogensiloxane, dimethylsiloxane, dimethylhydrogensiloxy, trimethylsiloxy, and $SiO_2$ units. The silicone polymer in the mixture preferably contains from 0.01 to 2.0 mole percent unsaturated monovalent aliphatic radical. Examples of such curing methods are found in U.S. Pat. Nos. 3,697,473, issued Oct. 10, 1973, to Polmanteer et al.; 3,445,420, issued May 20, 1969, to Kookootsedes et al.; and 4,032,502, issued June 28, 1977 to Lee et al., all of which are incorporated by reference to teach methods of mixing curing agents into diorganosiloxanes containing unsaturated monovalent aliphatic radicals in which the silicone polymer-filler mixture containing unsaturated monovalent aliphatic radicals of this invention can be substituted for the diorganosiloxane to produce curable compositions.

Compositions which cure to elastomers may also contain minor amounts of the usual additives to improve the heat stability, handling, compression set, oil resistance, etc.

The following examples are included for illustrative purposes only and should not be construed as limiting the invention which is properly set forth in the appended claims.

EXAMPLE 1

A mixture of polydimethylcyclosiloxane and hydroxyl endblocked polydimethylsiloxane was polymerized in the presence of fumed silica filler.

The polymerization was carried out in a laboratory dough mixer that was equipped for heating, cooling, purging with nitrogen, and trapping volatiles in the exhaust gas stream in a cold trap. This type of mixer provides a high degree of shear to the contents. The mixer was cleaned successively with isopropyl alcohol, acetic acid, and polydimethylcyclosiloxane to insure a clean, dry mixer.

Forty-three grams of fumed silica having a surface area of about 400 $m^2/g$ was combined with 208 g of a hydrolyzate of dimethyldichlorosilane, which is a mixture of hydroxyl endblocked polydimethylsiloxane having an average degree of polymerization of about 35 and polydimethylcyclosiloxane having an average degree of polymerization of between 4 and 5, by stirring them together in a glass jar for ½ hour. This mixture, in the form of a slurry, was then transferred into the clean mixer which had been preheated to 170° C. The mixture was stirred for 1 hour with a nitrogen purge to carry off any moisture. The mixer was cooled to 140° C. and then 0.123 ml of trifluoromethane sulfonic acid was injected into the mixer chamber. The mixing process continued without the nitrogen purge, allowing the mixer to cool for two hours. The nitrogen purge was then resumed and mixing at room temperature continued for an additional hour. The mixture was then inactivated by adding 10.4 g of calcined MgO and mixing for 20 minutes, to yield a silica filled polydimethylsiloxane base mixture in the form of a paste. The calcined MgO was made by heating 4 hours at 500° C. The base mixture was devolatilized by heating for 3 hours at 150° C. in an air-circulating oven. It had a weight loss of 10.4 percent.

A portion of the devolatilized base mixture was strained by extruding it through a screen with a space between the wires of 0.27 mm.

Forty gram portions of the devolatilized base mixture, both strained and unstrained, were mixed with 1.2 g of a mixture of 50 weight percent 2,4-dichlorobenzoyl peroxide in inert carrier (1.5 parts by weight peroxide per 100 parts by weight devolatilized base mixture). The catalyzed portions were compression molded for 5 minutes at 116° C. into test slabs, which were then post cured for 4 hours at 200° C.

Test samples were cut from the slabs and properties measured in accordance with ASTM D-2240 for durometer, and ASTM D-412 for tensile strength at break and elongation at break.

The weight average molecular weight of the polymer in the base mixture (before devolatilization) was determined by separating the polymer from the filler by mixing a sample of the base mixture in a mixture of ammonium hydroxide, water, and toluene for 24 hours, then centrifuging the sample. The polymer-toluene layer was removed, the toluene evaporated, and the polymer weight average molecular weight measured by use of gel permeation chromotography.

The test results in Table 1 show that the oligomers were polymerized in the presence of the fumed silica and the cured silicone polymer-filler mixture is a useful silicone rubber.

EXAMPLE 2

The entire procedure of Example 1 was repeated except the mixture was made using 62 g of the fumed silica so that there was 30 parts of silica per 100 parts by weight of hydrolyzate rather than 20 parts per hundred as in Example 1.

This base mixture had a weight loss of 15.3 percent when it was devolatilized. A portion of this base mixture was catalyzed, molded, cured, and tested as in Example 1.

The test results in Table 1 show that the oligomers were polymerized in the presence of the fumed silica and that the silicone polymer-filler mixture after catalyzation and cure produced a useful elastomer.

TABLE 1

| Example | Filler parts | Strained | Durometer Shore A | Tensile Strength MPa (megaPascal) | Elongation percent | Polymer Molecular Weight |
|---|---|---|---|---|---|---|
| 1 | 20 | no | 37 | 4.66 | 373 | 580,000 |
| 1 | 20 | yes | 34 | 6.21 | 530 | — |
| 2 | 30 | no | 53 | 4.71 | 273 | 340,000 |
| 2 | 30 | yes | 50 | 6.27 | 396 | — |

EXAMPLE 3

A hydroxyl endblocked polydiorganosiloxane was polymerized in the presence of fumed silica filler.

A dough mixer as described in Example 1 was used for the polymerization.

A mixture of 230 g of a hydroxyl endblocked polydimethylsiloxane having a degree of polymerization of about 35 (viscosity of about 0.07 Pa·s and molecular weight of about 2600) and 70 g of the fumed silica of Example 1 were mixed for 30 minutes in a glass jar to form a slurry, then for 30 minutes in the mixer which had been heated to 150° C. and had a nitrogen purge through the mixer to form a paste. Then the heat and purge were turned off. When the temperature dropped to 120° C., 0.136 g of trifluoromethane sulfonic acid was injected into the mixer. After 15 minutes mixing, the temperature had dropped to 70° C. and the nitrogen purge was resumed. After a total polymerization time of 4.5 hours, the mixer had reached room temperature. The catalyst was then inactivated by adding 15 g of the calcined MgO of Example 1. This base mixture was devolatilized by heating for 3 hours at 150° C. in an air-circulating oven. It had a weight loss of 7.2 percent.

Portions of the devolatilized base mixture were strained, then both strained and unstrained portions were catalyzed and tested as in Example 1 using the amounts shown in Table 2. Test results in Table 2 show that the oligomer was polymerized in the presence of the filler and compounded into silicone rubber.

TABLE 2

| Peroxide parts | Strained | Durometer Shore A | Tensile Strength MPa | Elongation percent | Polymer Molecular Weight |
|---|---|---|---|---|---|
| 1.5 | no | 38 | 3.76 | 293 | 393,000 |
| 3.0 | no | 46 | 3.67 | 220 | — |
| 1.5 | yes | 32 | 3.56 | 390 | — |
| 3.0 | yes | 41 | 5.23 | 340 | — |

EXAMPLE 4

The procedure of Example 3 was repeated using $CF_3COOH$ as the catalyst, rather than the $CF_3SO_3H$ used in Example 3. The hydroxyl endblocked polydiorganosiloxane did not polymerize using $CF_3COOH$ as a catalyst.

EXAMPLE 5

A mixture of polydiorganocyclosiloxanes was polymerized with fumed silica filler following the procedure used in the method of this invention.

In a dough mixer as described in Example 1, a mixture of 192 g of polydimethylcyclosiloxane and 0.39 g of polymethylvinylcyclosiloxane were mixed with 58 g of the fumed silica of Example 1. These cyclic siloxanes had an average degree of polymerization between 4 and 5. The resulting mixture was placed in the mixer which had been heated to 170° C. (150° C. in the mixture). After mixing for 1 hour at 150° C. under a purge of dry nitrogen, the mixer was cooled to 140° C., the purge stopped, and 0.114 ml of trifluoromethane sulfonic acid was added. The mixer was cooled to room temperature over a two-hour period. A low molecular weight polymer-filler paste mixture had formed. The mixture was stirred for 1 hour at room temperature under a dry nitrogen purge to remove water. During this period, the polymer-filler mixture changed into a crumbly powder. Then five parts of calcined magnesium oxide were admixed for each 100 parts of polymer-filler mixture to inactivate the catalyst.

The silicone polymer-filler mixture was mixed on a two-roll mill into a flat sheet, then the sheet was placed into an air-circulating oven for 3 hours at 150° C. for devolatilization. During this heating period, the silicone polymer-filler mixture lost 20.8 percent of its weight.

A portion of the devolatilized mixture was combined with 1.5 parts by weight of the peroxide catalyst of Example 1 per 100 parts by weight of mixture. The sample was then molded and tested as in Example 1. The properties were durometer, Shore A, 73; tensile strength, 5.02 MPa; elongation, 120 percent; polymer molecular weight, 236,000; showing useful polymerization in the presence of reinforcing silica filler.

EXAMPLE 6

A polydiorganocyclosiloxane was polymerized in the presence of carbon black filler.

A dough mixer as described in Example 1 was heated to 170° C., then loaded with 150 ml of polydimethylcyclosiloxane, having an average degree of polymerization between 4 and 5, and 59 g of acetylene black having a surface area of about 65 $m^2/g$ and a pH of about 7.5. These ingredients were mixed for 20 minutes at temperature with a dry nitrogen purge to remove any moisture present. The heating was stopped and the mixer was allowed to cool to 140° C., then 0.085 ml of trifluoromethane sulfonic acid was added, stopping the nitrogen purge before the catalyst addition. After 15 minutes the purge was restarted. About 2 hours after the catalyst addition, the polymerized mixture was treated with 11.5 ml of hexamethyldisilazane to inactivate the catalyst, the nitrogen purge was stopped and mixing continued for 20 minutes to yield a carbon black filled polydimethylsiloxane base mixture.

A small sample of the base mixture was dissolved in toluene, centrifuged, decanted, rediluted and centrifuged, then filtered. The polymer was analyzed and found to have a number average molecular weight of 82,700 and a weight average molecular weight of 1,010,000. Following the method of this invention yielded a polymer formed in the presence of reinforcing filler.

A 60 g portion of the mixture was mixed with 1.8 g of dicumyl peroxide, then molded into a test slab by pressing for 10 minutes at 150° C. The durometer, Shore A, was 50, tensile strength was 2.3 MPa, and ultimate elongation was 186 percent.

EXAMPLE 7

A polydiorganocyclosiloxane was polymerized in the presence of fumed silica filler.

A premix was prepared by mixing 208 g of polydimethylcyclosiloxane, having an average degree of polymerization between 4 and 5, with 42 g of fumed colloidal silica. The mixture was added to a mixer preheated to 170° C. and mixed for 30 minutes under a dry nitrogen purge. The heat and purge were stopped and 0.123 ml of trifluoromethane sulfonic acid was added with the mixture temperature at 140° C. The mixture was allowed to slowly cool while mixing continued. After 4 hours, the nitrogen purge was resumed. After an additional hour the mixture was inactivated by adding 2.08 g of magnesium oxide and mixing for 20 minutes.

A 60 g portion of the mixture was milled into a sheet, then heated for 3 hours at 150° C. to remove volatiles. The silicone polymer-filler mixture had a weight loss of 29.4 percent.

A 36.9 g portion of the devolatilized mixture was mixed with 0.54 g of 2,4-dichlorobenzoyl peroxide and molded into a test sheet by pressing for 5 minutes at 116° C. The cured material had a durometer of 32, tensile strength of 5.81 MPa, and an ultimate elongation of 520 percent. This useful silicone rubber was made following the claimed method.

EXAMPLE 8

A mixture of 400 g of polydimethylcyclosiloxane, having an average degree of polymerization between 4 and 5, and 3.35 g of bis(phenylmethylvinyl)disiloxane was placed in a dough mixer and then 80 g of fumed silica having a surface area of about 250 $m^2/g$ was mixed in. Trifluoromethane sulfonic acid in an amount of 0.71 ml was mixed in, then the mixture was heated while mixing to 70° C. (requiring about 10 minutes) under a dry nitrogen sweep and allowed to polymerize for 1 hour without additional heat. The mixture was then reheated to 70° C., then allowed to cool while mixing an additional hour. Then 7.5 g of calcined magnesium oxide was added and mixed for ½ hour. The mixer was then heated by applying 150 lb. steam and the mixture was subjected to a reduced pressure of 97 kPa to remove volatiles. The devolatilization continued for 2 hours, then the mixture was cooled to room temperature. Analysis of the polymer showed a vinyl content of 0.14 percent by weight, a number average molecular weight of 36,000, and a weight average molecular weight of 73,400; thus polymer was formed in the presence of reinforcing filler.

A sample of the devolatilized mixture was combined with sufficient trimethylsiloxy endblocked polyorganohydrogensiloxane having an average of 5 methylhydrogensiloxane units and 3 dimethylsiloxane units to give an $\equiv$SiH/$\equiv$SiVi ratio of 1.75, a platinum containing catalyst and a catalyst inhibitor. Test samples were prepared by molding for 15 minutes at 175° C. under about 20,000 psi, 137.9 MPa pressure. The physical properties were: durometer, Shore A 30, tensile strength 3.93 MPa, and ultimate elongation 316 percent.

After storage for 26 days, the viscosity of the devolatilized mixture increased by a slight amount.

That which is claimed is:

1. A method of polymerizing oligomer in the presence of reinforcing filler comprising
(A) mixing (i) 100 parts by weight of oligomer selected from the group consisting of polydiorganosiloxane (a) of the formula HO(R$_2$SiO)$_x$H, polydiorganocyclosiloxane (b) of the formula

and mixtures thereof, optionally (i) can have present oligomer selected from the group consisting of polydiorganosiloxane (c) of the formula R'$_3$SiO(R$_2$SiO)$_z$SiR'$_3$, polydiorganosiloxane (d) of the formula R'$_3$SiO(R$_2$SiO)$_z$H, and mixtures thereof wherein each R is a radical selected from the group consisting of methyl, ethyl, propyl, phenyl, vinyl, allyl, and 3,3,3-trifluoropropyl; each R' is monovalent hydrocarbon radical of 6 or less carbon atoms, x is an average value in the range of from 3 to 50, y is an average value in the range of from 3 to 10, and z is an average value in the range of from 0 to 50 inclusive; with (ii) from 2 to 70 parts by weight of reinforcing filler which is acidic or neutral, to yield a paste-type material,
(B) intiating polymerization of (A) in a closed system at a temperature in the range of 70° C. to 150° C. with from 400 to 4000 parts by weight trifluoromethane sulfonic acid per million parts by weight of (i), then agitating the resulting product of (B) adjusting its temperature to a value in the range of 20° C. to 100° C., polymerizing until the desired increase in molecular weight is reached, then
(D) admixing a Lewis base to inactivate the trifluoromethane sulfonic acid and produce a non-crepeing silicone polymer-filler mixture.

2. The method of claim 1 in which the reinforcing filler is fumed silica, the resulting mixture of step (A) is heated in a closed system to a temperature of from 100° C. to 200° C. for a time sufficient to remove any free water, removing such water from the system; then continuing with step (B), adjusting, if necessary, the temperature to from 100° C. to 150° C. before adding the trifluoromethane sulfonic acid.

3. The method of claim 2 in which x is from 10 to 50, y is from 3 to 6, the amount of trifluoromethane sulfonic acid is from 500 to 1500 parts by weight per million parts by weight of (i), and the Lewis base is calcined magnesium oxide.

4. The method of claim 3 in which the temperature is reduced during step (C) to a range of from 20° to 30° C., water is removed, and the polymerization is continued to yield a silicone polymer-filler mixture in which the polymer has a degree of polymerization of greater than 1000.

5. The method of claim 4 in which the silicone polymer-filler mixture is further mixed with an organic peroxide suitable for curing silicone elastomers to yield a curable composition.

6. The method of claim 4 in which the resulting mixture of step (A) is heated to a temperature of from 140° C. to 170° C., then adjusted to a temperature of from 110° C. to 140° C. before addition of the trifluoromethane sulfonic acid in step (B).

7. The method of claim 6 in which the silicone polymer-filler mixture is further mixed with an organic peroxide suitable for curing silicone elastomers to yield a curable composition.

8. The method of claim 1 in which from 0.01 to 2.0 percent of R plus R' are vinyl radicals.

9. The method of claim 8 in which the vinyl radicals are derived from polydiorganosiloxane (c), z is from 0 to 21, the reinforcing filler is from 5 to 20 parts by weight of fumed silica, and the Lewis base is calcined magnesium oxide.

10. The method of claim 9 in which the silicone polymer-filler mixture is further mixed with a curing agent comprising an organohydrogensiloxane in sufficient amount to provide at least one silicone-bonded hydrogen atom per vinyl radical in (i), said organohydrogensiloxane having an average of at least three silicon-bonded hydrogen atoms per molecule and having units selected from the group consisting of methylhydrogensiloxane, dimethylsiloxane, dimethylhydrogensiloxy, trimethylsiloxy, and SiO$_2$ units; and an amount of a platinum catalyst in an amount sufficient to provide at least one part by weight of platinum per million parts by weight of silicone polymer in the silicone polymer-filler mixture.

11. The non-crepeing silicone polymer-filler mixture produced by the method of claim 1.

12. The curable composition produced by the method of claim 5.

13. The curable composition produced by the method of claim 7.

14. The curable composition produced by the method of claim 10.

15. The cured product obtained by heating the composition of claim 12.

16. The cured product obtained by curing the composition of claim 14.

17. The method of claim 8 in which (i) is the polydiorganocyclosiloxane (b), y having an average value of from 3 to 6, the vinyl radicals are derived from polydiorganosiloxane (c), z is from 0 to 21, the reinforcing filler is fumed silica, and the Lewis base is calcined magnesium oxide.

18. The method of claim 17 in which the non-crepeing silicone polymer-filler mixture is further mixed with an organic peroxide suitable for curing silicone elastomers to yield a curable composition.

19. The method of claim 17 in which the non-crepeing silicone polymer-filler mixture is further mixed with a curing agent comprising an organohydrogensiloxane in sufficient amount to provide at least one silicone-bonded hydrogen atom per vinyl radical in (i), said organohydrogensiloxane having an average of greater then two silicon-bonded hydrogen atoms per molecule and having units selected from the group consisting of methylhydrogensiloxane, dimethylsiloxane, dimethylhydrogensiloxy, trimethylsiloxy, $SiO_2$ units, and mixtures thereof; and an amount of a platinum catalyst in an amount sufficient to provide at least one part by weight of platinum per million parts by weight of silicone polymer in the silicone polymer-filler mixture.

20. The curable composition produced by the method of claim 18.

21. The curable composition produced by the method of claim 19.

22. The method of claim 1 in which the non-crepeing silicone polymer-filler mixture is further mixed with curing agent to yield a curable composition.

23. The method of claim 22 in which the curing agent is a moisture sensitive crosslinker and the curable composition cures at room temperature.

24. The curable composition produced by the method of claim 23.

* * * * *

UNITED STATES PATENT AND TRADEMARK OFFICE
CERTIFICATE OF CORRECTION

PATENT NO. : 4,448,927

DATED : May 15, 1984

INVENTOR(S) : James R. Falender, John C. Saam

It is certified that error appears in the above-identified patent and that said Letters Patent is hereby corrected as shown below:

In column 15, line 67, insert -- (C) -- before "agitating".

Signed and Sealed this

Twenty-sixth Day of March 1985

[SEAL]

Attest:

DONALD J. QUIGG

*Attesting Officer*      *Acting Commissioner of Patents and Trademarks*